United States Patent [19]

Hungerbühler et al.

[11] Patent Number: 5,340,951
[45] Date of Patent: Aug. 23, 1994

[54] DEVICE FOR REDUCING THE FORCE IN A FORCE-MEASURING APPARATUS, IN PARTICULAR IN A SCALE

[75] Inventors: Ernst Hungerbühler, Fehraltorf; Hans R. Burkhard, Schwerzenbach, both of Fed. Rep. of Germany

[73] Assignee: Mettler-Toledo AG, Greifensee, Switzerland

[21] Appl. No.: 898,621

[22] Filed: Jun. 15, 1992

[30] Foreign Application Priority Data

Jun. 14, 1991 [DE] Fed. Rep. of Germany ....... 4119734

[51] Int. Cl.⁵ .............................................. G01G 3/08
[52] U.S. Cl. .............................. 177/229; 177/210 EM; 73/862.621
[58] Field of Search ............... 177/229, 211, 210 EM; 403/291; 73/862.621

[56] References Cited

U.S. PATENT DOCUMENTS

| | | | |
|---|---|---|---|
| 2,866,059 | 12/1958 | Laimins | 177/229 |
| 4,143,727 | 3/1979 | Jacobson | 177/229 X |
| 4,505,345 | 3/1985 | Jetter | 177/229 X |
| 4,600,066 | 7/1986 | Gritten et al. | 177/229 X |
| 4,799,561 | 1/1989 | Komoto | 177/229 |
| 4,813,505 | 3/1989 | Södler et al. | 177/229 X |

FOREIGN PATENT DOCUMENTS 291258 11/1988 European Pat. Off. .
393323 10/1990 European Pat. Off. .

OTHER PUBLICATIONS

Japan Electronic Balance 1-240830 (A) Akira Kawamoto (Abs).
Japan Electronic Balance 2-124433 (A) Akira Kawamoto (Abs).

*Primary Examiner*—Benjamin R. Fuller
*Assistant Examiner*—Randy W. Gibson
*Attorney, Agent, or Firm*—Anderson Kill Olick & Oshinsky

[57] ABSTRACT

Figure 1:
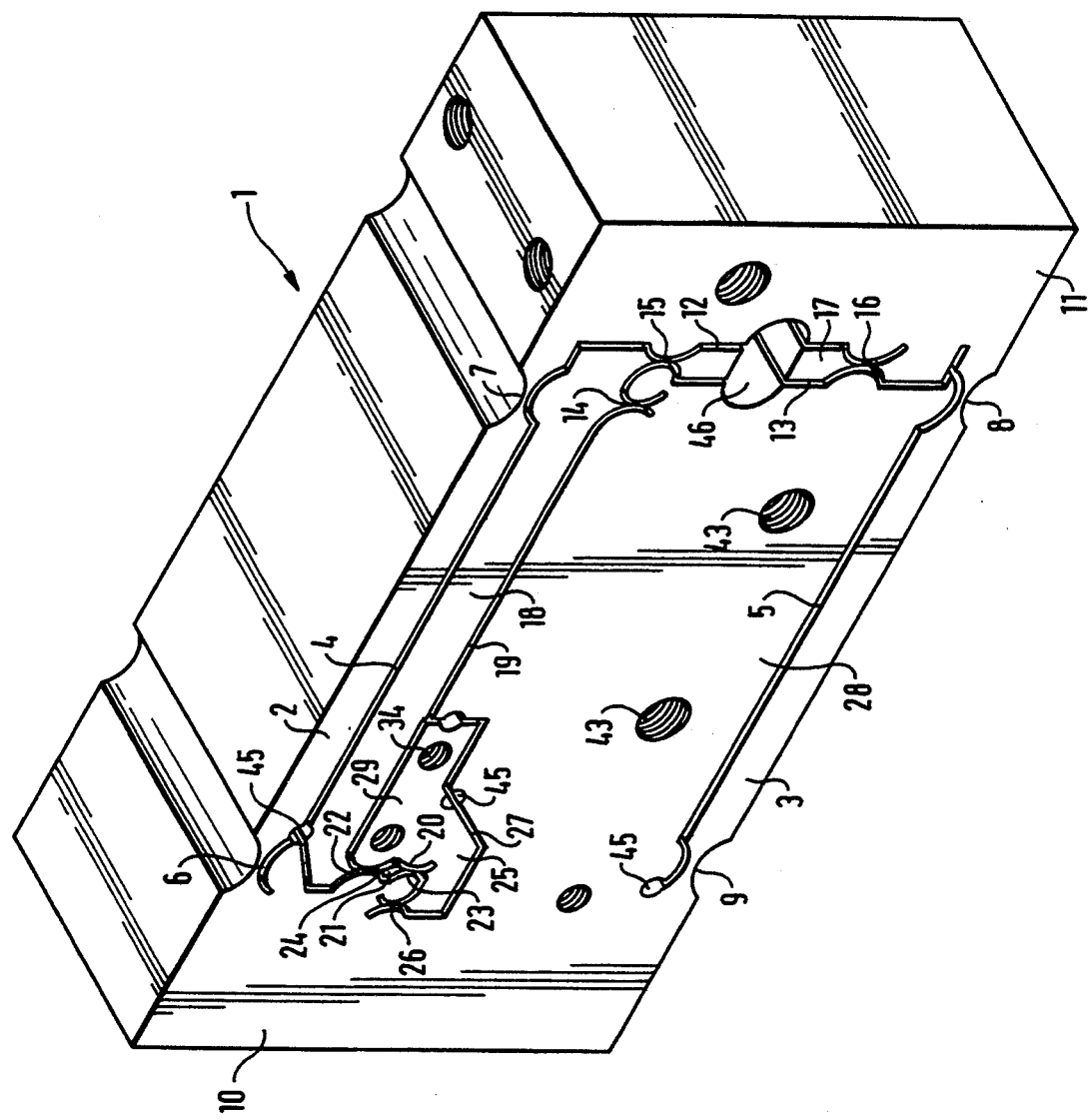

Single-piece force-reducing devices for force-measuring apparatuses include levers (18, 25) for reducing the force, and coupling members (17, 21) for transmitting the force, which are formed by no-material portions in one single solid block (1). However, deflection of the levers (18, 25) and, in particular, displacement of their fulcrums (14, 26) leads to incorrect measuring results, so that it is an objective to achieve a very high rigidity of the system under load. In order to achieve such very high rigidity, while the overall size of the system is kept small, the invention provides no-material portions (4, 5, 19, etc.) which make it possible to remove only a minimum of material, resulting in a favorable increase in thickness of the highest-loaded parts, (FIG. 1).

35 Claims, 7 Drawing Sheets

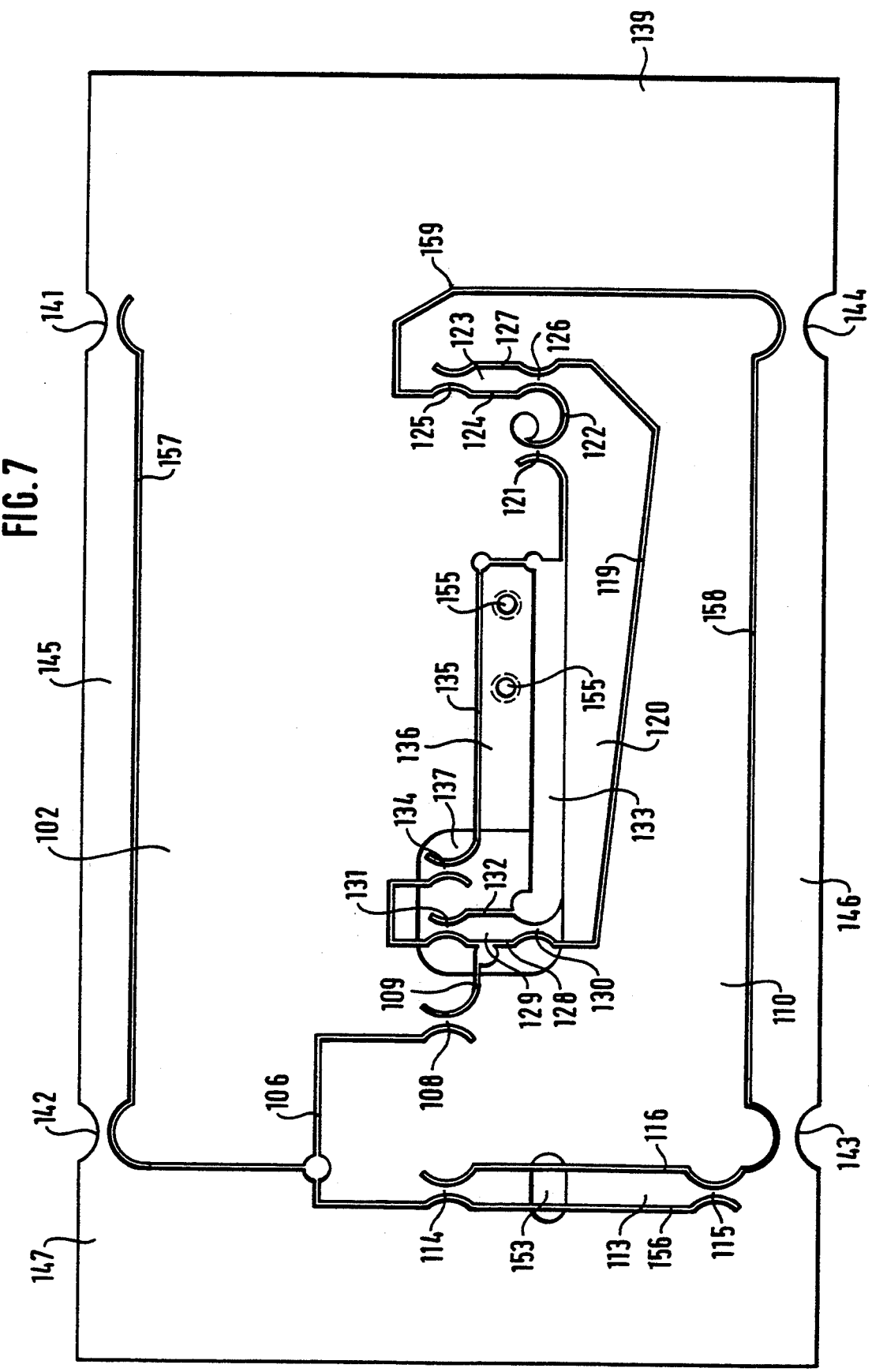

DEVICE FOR REDUCING THE FORCE IN A FORCE-MEASURING APPARATUS, IN PARTICULAR IN A SCALE

This invention relates to a device for reducing the force in a force-measuring apparatus, in particular in a scale, having at least one rigid lever supported by a stationary member and serving to reduce the force, and at least one axially rigid, flectionally elastic coupling member, in which the stationary member, the lever and the coupling member are formed by solid portions of a single-piece solid block of material, said solid portions being bounded by portions of no material, which are formed by cutouts extending through the solid block perpendicularly to the plane of rotation of the lever, of which the solid portion forming the lever is linked to the solid portion forming the stationary member only via a flectionally elastic domain formed in the solid block and representing the fulcrum, and of which the solid portion forming the coupling member is linked to the solid portion forming the lever only via a localized linkage section formed in the solid block.

The purpose of such force-reducing devices is to reduce the input force, such as the weight of a scale capable of bearing high loads, to be measured by the force-measuring apparatus to such an extent that the force received after force reduction is adapted to the available loading capacity of a load cell serving to produce a measuring signal. Load cells of this type are, for example, load cells with vibrating strings, piezoelectric load cells, or load cells with electromagnetic force compensation. If there is required only a comparatively small ratio of reduction, devices with only one single lever for reducing the force can be used. For high forces, i. e. high input weights, however, devices with two, three or even more series-connected levers are necessary.

Known devices of the type mentioned initially above mostly are formed in one piece not only in itself, but also in one piece with a parallelogram guide for a force-applying element serving to apply the force to be measured to the coupling member of the lever, and are advantageous mainly in view of the fact that, due to the single-piece construction, all assembling work for mutually connecting the individual component parts by means of separately formed bending portions is saved. Furthermore, as a result of the single-piece construction, the properties of the material used are the same throughout the whole device, so that any errors caused by the different properties of the material are eliminated.

In the known devices, the portions of no material, which separate the solid portions forming the stationary member, the lever and the coupling member from each other, have a comparatively large width as viewed in the plane of rotation of the lever, so that there is a comparatively large free space between these parts. In particular, in the known devices the flectionally elastic domains forming the fulcrums of the levers, and the linkage sections of the coupling members are bounded by bores formed in the solid block, these bores being arranged side by side in pairs so as to leave a thin section of the solid block in between which forms the fulcrum or linkage section, respectively. However, the relatively wide no-material portions and, in particular, the bores defining the thin sections in the known devices weaken the material also just in those regions where the solid portions bounded by these no-material portions are stressed to a particularly high extent. Thus, if there are given spatial dimensions of the solid block, the shape of the no-material portions prevailing in the known devices adversely affects the complete rigidity and loading capacity of the device, and thus also the resolution and accuracy that can be attained. If, on the other hand, the thickness of the respective solid portions is dimensioned to be as large as required, the overall size of the device will increase correspondingly, and this undesirable increase in overall size is, at least to some extent, due to the volume of the no-material portions in the solid block separating the individual solid portions from each other. Given that in the known devices attention is paid substantially only to the configuration of the solid portions forming the elements of force reduction, while no attention is paid to the shape of the no-material portions delimiting the solid portions, either no optimum small overall size or no optimum high rigidity can be achieved.

It is an object of this invention to provide an arrangement of the type mentioned initially above whose rigidity and loading capacity is as high as possible while its overall size is kept as small as possible.

This object is achieved according to the invention in that each of the no-material portions is formed only by a thin line cut separating the solid block, at least in their sections extending along the zones of the linked solid portions that are loaded highest by the force to be reduced.

In the device according to the invention therefore not only the solid portions forming the necessary elements of the force reduction arrangement are suitably shaped, but also the no-material portions delimiting the solid portions are shaped in such a manner that a maximum rigidity and loading capacity and, at the same time, a minimum overall size is achieved. In particular, the device according to the invention takes account of the fact that the rigid or low-deflection measuring systems require only a very small deflection of the elements of force reduction, so that the no-material portions need to have only a very small width as viewed in the plane of rotation of the levers. If this is realized at least in those sections of the no-material portions that extend along the highest-loaded zones of the solid portions, in particular those forming the lever and the stationary member, a particularly high thickness and high loading capacity is achieved there, while saving at the same time some of the overall size of the device. The thin line cuts forming these sections of the no-material portions can, in particular, be produced through spark-erosion, with a cutting width in the order of several tenths of a millimeter, for example. In practice, spark erosion presently easily covers a range of width between 0.1 and 0.35 mm and prototype embodiments of the invention have preferably been made by spark erosion with a width of 0.25 mm. Preferably, the width will be selected to be not greater than 1 mm and most preferably not greater than 0.5 mm. Cutting methods other than spark erosion, e. g. the method of using a water torch, may practically favor the upper portion of the before-mentioned preferred width range of up to 1 mm.

Any other suitable technology for forming the thin-line cut with a sufficiently small width and without undue degradation of the solid portions defined by the thin-line cut may alternatively be used. The formation of no-material portions delimiting less loaded zones of the linked solid portions may alternatively be formed with larger width. In particular, these uncritical zones of the no-material portions may be preformed in the single-piece solid block of material, e. g. by molding, drilling or any other type of cutting.

Thereby it is possible to attain a resolution in the order of $10^5$ to $10^6$ for loads of several ten kilograms up to, for example, 60 kg, with the overall size of the system being small. Due to the small amount of material removed, it presents no difficulties to connect a plurality of levers in series, in which connection the ratio of reduction of the highest-loaded first lever may, for reasons of rigidity, be determined to be smaller than 10. By the use of two or three additional levers connected after this first lever, it is then possible to achieve total reduction ratios of up to $10^3$, while the overall size of the device is small. As far as a certain sweep width is desired on the output side, i. e. at the last lever, the no-material portion delimiting this last lever may nevertheless be wider in contrast to a thin line cut, as in the case of this last lever the loading strength requirements are relatively low because of the high force reduction already effected.

The special shape of the no-material portions in the highly loaded zones in any case allows for a thickness of the lever, or levers, and of the stationary member that is large enough to eliminate any bending which would affect measurement accuracy. At the same time especially the creation of the thin line cuts through spark erosion allows one to shape these line cuts in any way desired, so that in particular the bending portions serving as fulcrums of the levers can be given an optimum shape, in particular deviating from purely circular delimitation lines.

For fabrication of the solid block, a large number of suitable materials is available. Well-proven materials for single-piece force-reducing devices are, above all, aluminum alloys. But also steel, for example, represents a suitable material.

In a special embodiment of the principle of removing a minimum of material in the no-material portions adjacent the highly-loaded zones as defined in detail in claim 1, the no-material portion which separates the solid portion forming the coupling member and its linkage section to the lever from the solid portion forming the lever is in the form of the thin line cut. Thus, as large a thickness as possible remains for the lever arm adjacent the coupling member, which lever arm is loaded highest with the force applied via the coupling member, as a result of which this lever is protected against undesirable deflection under high load. At the same time, the coupling member which extends perpendicularly to the longitudinal axis of the lever can be restricted in its longitudinal extent to approximately the transverse extent of the lever, said longitudinal extent being oriented perpendicularly to the longitudinal axis, and can be arranged directly adjacent the lever and separated from the latter only by the thin line cut, so that the size of the device is small in the direction that is perpendicular to the longitudinal axis of the lever.

Furthermore, in an advantageous development of the invention, the rigidity of the lever arm, on which the force to be reduced is applied via the coupling member, is influenced favorably in that the no-material portion which separates the solid portion forming the stationary member from the solid portion forming the lever is in the form of the thin line cut, at least in its section delimiting the fulcrum on the side which is directed toward the coupling member. Thereby the full length, limited only by the width of the thin line cut, remains for the lever arm between the fulcrum of the lever and the linkage section of the coupling member, so that the lever arm formed between the fulcrum and the linkage section of the coupling member is of as high a rigidity as possible.

On the other hand, in an advantageous refinement the no-material portion which separates the solid portion forming the lever from the solid portion forming the stationary member is in the form of the thin line cut in its section which extends away from the section delimiting the fulcrum on the side directed toward the coupling member and then to the linkage section of the coupling member. Through this configuration, where the section of the no-material portion that extends from the fulcrum of the lever to the linkage section of the coupling member, too, is in the form of the thin line cut, not only the share of material available for the lever arm between the coupling member and the fulcrum becomes as large as possible in case of a given overall dimension of the device, but also the share of material that remains for the adjacent portion representing the stationary member, so that there is also a favorable effect on the rigidity of the stationary member which supports the lever.

Thus the inventive idea, which is made use of both with devices having only one single force-reducing lever and with devices having a plurality of such levers connected in series therein, in the latter case in particular covers also a device wherein the coupling member represents a first coupling member for applying the force to be reduced to the lever, and the lever represents a first lever for a rigid second lever connected after the first lever and serving to further reduce the force, said device being advantageously improved in that the no-material portion which separates the solid portion forming the first lever on the side which is adjacent the second lever from the solid portion forming the second lever is in the form of the thin line cut. In this configuration, the first and the second lever are disposed directly adjacent each other as viewed in their plane of rotation, and are spaced apart only by the thin line cut forming the separating no-material portion. Thus there remains available as large a share of material as possible for the thickness of the two levers as viewed perpendicularly to their longitudinal direction and, at the same time, the size of the device, viz. as viewed perpendicularly to the longitudinal direction of the levers, is minimized.

In this context, a particularly advantageous refinement of the invention is characterized in that a solid portion which forms an axially rigid, flectionally elastic second coupling member and which is separated from the solid portion forming the first lever only by a no-material portion in the form of the thin line cut is provided at one end of the solid portion forming the first lever, said end being opposite to the linkage section of the first coupling member to the first lever beyond the fulcrum thereof, whose one end which is opposed to the linkage section of the second coupling member to the first lever is linked to the solid portion supported by the stationary member and forming the second lever. Here again, due to the special shape of the no-material portion separating the second coupling member from the first lever, the size of the device is particularly small, while preserving at the same time a maximum amount of material available for the loaded parts because the second coupling member and the portion of the first lever that is connected with the second coupling member are arranged adjacent to each other as viewed in the longitudinal direction of the two levers and are separated from each other only by a no-material portion of minimum width. Thereby not only the extent in the longitudinal direction of the two levers is kept small, but also the extent that is perpendicular thereto, because the second coupling member and the portion of the first lever that is connected therewith are arranged side by side in the longitudinal direction rather than one above the other in the direction that is perpendicular to the longitudinal direction.

In this context, the advantages of spatial compactness and mechanical rigidity as well as of simplified manufacture resulting from the minimum of removed material are further increased in that the no-material portion which separates the solid portion forming the second coupling member on the side that is opposed to the first lever from the solid portion forming the stationary member is in the form of the thin line cut.

Additionally, a further advantageous development of this embodiment is characterized in that the no-material portion which separates the solid portion forming the stationary member from the solid portion forming the first lever is in the form of the thin line cut in the section that extends away from the no-material portion delimiting the linkage section of the second coupling member to the first lever on the side which is directed toward the stationary member. Thus, the first lever is separated from the stationary member in the portion which is connected with the second coupling member only by the thin line cut so that, in particular, the material available for the stationary member is weakened to as small an extent as possible and therefore the rigidity, which is of special importance to the stationary member, too, is enhanced.

For the purpose of simplified manufacture by removing a minimum of material, and for the purpose of increasing the rigidity as a result thereof, the embodiments of the present invention are further developed in that the no-material portion which separates the solid portion forming the stationary member from the solid portion forming the second lever is in the form of the thin line cut in the region of the fulcrum of the second lever.

According to one further idea of the invention, in embodiments that include at least two levers the boundary between the two levers is such that the no-material portion, which separates the solid portion forming the second lever on the side that is directed toward the first lever from the solid portion forming the first lever, and which is in the form of the thin line cut, is inclined in the section that extends away from one end of the no-material portion which separates the second coupling member from the first lever, said end separating the linkage section to the second lever, and then toward the fulcrum of the first lever to its end which is opposite to the second coupling member, at such an angle relative to the longitudinal direction of the two levers that the first lever is tapered toward the second coupling member and the second lever toward the first coupling member. Thereby the thickness of the levers as viewed perpendicularly to the longitudinal direction of the two levers is enlarged in the portion of each lever that lies adjacent the location where the force to be reduced is applied so that these portions are wider than the end portions of the levers that lie opposite the location where the force is applied, whereby, due to the side-by-side arrangement of the two levers, the enlarged end of one lever lies adjacent the narrower end of in the other lever, and vice versa. The attendant decrease in thickness which is due to the tapered shape of the levers the end portions of the levers that are opposed to the points of force application does not mean any loss in rigidity, as these end portions are loaded only with the reduced force and thus the smaller force. On the other hand, the highly stressed portions where the force to be reduced is applied are enlarged over these less stressed end portions, which enlargement however does not involve any increase in the size of the device.

In an embodiment with three levers, special use is made of the inventive idea in that a solid portion, which is separated from the first lever only by a no-material portion in the form of the thin line cut and which forms an axially rigid, flectionally elastic third coupling member, is provided at one end of the solid portion which forms the second lever, said end being opposite to the linkage section of the second coupling member to the second lever beyond the fulcrum thereof, whose one end which is opposite to the linkage section of the third coupling member to the second lever acts upon a solid portion which is supported by the stationary member and forms a rigid third lever serving to further reduce the force. In this configuration, where the third coupling member acting on the third lever is separated from the first lever only by means of the thin line cut, the principle of maximal compactness and minimal removal of material is consistently adhered to in devices with at least three levers. Here all three coupling members thus extend perpendicularly to the common longitudinal direction of the three levers, each coupling member being directly adjacent to one of the levers and separated from it only by the thin line cut.

Further, in another advantageous refinement of the invention the no-material portion which separates the solid portion forming the third coupling member and its linkage section to the third lever from the solid portion forming the third lever is in the form of the thin line cut. Here, on the side that is directed toward the third coupling member, the solid portion that is available for forming the lever arm of the third lever to which the force to be reduced is applied by means of the third coupling member is reduced through the thin line cut only by a minimum of material, so that the rigidity of this highest-stressed portion of the third lever is increased.

Similarly, the rigidity of the highest-loaded portion of the third lever is optimized in a further refinement of the invention in that the no-material portion which separates the solid portion forming the stationary member from the solid portion forming the third lever is in the form of the thin line cut at least in the section that delimits the fulcrum of the third lever on the side that is directed toward the third coupling member.

Within the scope of the invention it is further provided that the solid portion which forms the stationary member is mounted, in the interior of a single-piece parallelogram guide which is comprised of a fixedly supported leg of the parallelogram, two axially rigid, flectionally elastic link members which are essentially parallel to each other, and a movable leg of the parallelogram which is parallely guided at the fixed leg of the parallelogram by means of the link members and receives the force to be measured, to the fixed leg of the parallelogram, and in that the respective linkage section of the coupling member adjacent the movable leg of the parallelogram is mounted to the movable leg of the parallelogram. Thereby it is possible to insert the device for force-reduction into the parallelogram guides being especially provided in force-compensation-type scales in a structurally simple and compact manner. Here the single-piece parallelogram guide on the one hand and the single-piece force-reducing device on the other hand may, however, be formed separately from each other. Then, at least in the region of the connecting portion between the stationary member and the fixed leg of the parallelogram and the connecting portion between the coupling member and the movable leg of the parallelogram, the parts to be coupled together abut each other in a form-interlocking manner and can simply be fixed together through bolt connection. In particular, through this separate construction of the parallelogram guide and the force-reducing device the thickness of the force-reducing device and of the parallelogram guide as measured perpendicularly to the plane of rotation of the levers can be designed to be different, for example by providing the parallelogram guide with a thickness that is considerably increased over that of the force-reducing device, which may be desirable for the purposes of receiving the force and applying the force from a weighing pan to the movable leg of the parallelogram.

Alternatively, the structure of the device may be such that the stationary member is formed in the interior of a single-piece parallelogram guide which is comprised of a fixedly supported leg of the parallelogram, two axially rigid, flectionally elastic link members which are parallel to each other, and a movable leg of the parallelogram which is parallely guided at the fixed leg of the parallelogram by means of the link members and receives the force to be measured, as a single-piece solid portion integral with the fixed leg, and in that the respective linkage section of the coupling member adjacent the movable leg of the parallelogram is linked to the movable leg of the parallelogram in one piece. Thus, in this embodiment, the parallelogram guide and the force-reducing device are formed from one single solid block in one single piece.

In a particularly advantageous refinement of this altogether single-piece design the no-material portion which separates the solid portion forming the stationary member in its section adjacent the parallelogram guide from the solid portion forming the parallelogram guide is in the form of the thin line cut. Thus there is only a minimum of space, formed by the thin line cut, between the section of the stationary member that is adjacent the parallelogram guide and the parallelogram guide, in particular between the stationary member and one of the two link members of the parallelogram guide, so that a maximum of thickness available for the stationary member is left, while the manufacturing process is simplified in that in this section only one single line cut is necessary for forming the stationary member within the parallelogram guide.

Similarly, a minimum of material removed, an overall size that is as small as possible, an increased rigidity, and a simple manufacture is achieved in a further advantageous refinement of the invention in that the no-material portion which separates the solid portion forming the coupling member adjacent the movable leg of the parallelogram from the solid portion forming the movable leg of the parallelogram is in the form of the thin line cut. The coupling member serving to transmit the force from the movable leg of the parallelogram to the single lever or the first lever of a force-reducing system having a plurality of levers thus extends along the movable leg of the parallelogram and is separated therefrom only by the thin line cut. Thereby in particular the overall dimension as viewed in the longitudinal direction of the lever, i. perpendicularly to the direction in which the coupling member extends, is kept small and therefore the share of material available for the portion of the lever to which the load of the coupling member is applied becomes as large as possible.

Finally, constructional compactness, increased rigidity and simple manufacture can be further enhanced if the no-material portion which separates the solid portion forming the lever adjacent the parallelogram guide from the solid portion forming the parallelogram guide is in the form of the thin line cut. Thereby, the whole portion that serves to reduce the force is tightly fitted into the portion that forms the parallelogram guide by being separated also on the side of the lever only by the thin line cut.

Also within the scope of the invention is another advantageous embodiment which is characterized in that the single-piece solid block comprises solid portions which form a fixedly supported leg, two axially rigid, flectionally elastic link members which are parallel to each other and a movable leg of a parallelogram guide, said movable leg of the parallelogram being parallely guided at the fixed leg of the parallelogram by means of the link members and serving to receive the force to be measured, in that the stationary member is formed by a single-piece solid portion of the fixed leg of the parallelogram which projects into the interior of the parallelogram guide, and in that the no-material portion which separates the solid portion forming the stationary member on the side that is directed toward one link member from the solid portion forming said link member is in the form of the thin line cut. Thus, in this embodiment the stationary member is separated from one of the two link members of the parallelogram guide only through the thin line cut. In case of a given size of the solid block in the direction that is perpendicular to the longitudinal direction of the link members therefore the height available in this direction for the stationary member is kept as large as possible due to the minimal amount of material removed between the stationary member and the adjacent link member. Since the forces acting on the stationary member as a result of the lever supported by it are exerted in this perpendicular direction, the objective of obtaining as high a rigidity of the stationary member as possible in this direction is thereby achieved.

One further refinement of this embodiment which has the similar objective of removing a minimum of material so as to maximize the rigidity and minimize the size of the device is characterized in that the no-material portion which separates the solid portion forming the lever on the side adjacent one link member, which link member is opposite to the other link member adjacent the stationary member, from the solid portion forming the one link member is in the form of the thin line cut.

Also, it is advantageous to develop this embodiment of the invention in such a way that the no-material portion, which separates the solid portion forming the coupling member that extends from its linkage section to the movable leg of the parallelogram in parallel therewith to its linkage section to the one end of the lever which is directed towards the movable leg of the parallelogram from the solid portion forming the stationary member, is in the form of the thin line cut. Thus, the coupling member extends perpendicularly to the longitudinal direction of the link members and the lever between the movable leg of the parallelogram and the end portion of the stationary member directed toward it, and is separated from the stationary member only through the thin line cut.

The idea of minimizing the amount of material removed is advantageously made use of on the side of the coupling member that is opposite to the stationary member in that the no-material portion, which separates the solid portion forming the coupling member that extends from its linkage section to the movable leg of the parallelogram in parallel therewith to its linkage section to the one end of the lever which is directed toward the leg of the parallelogram from the solid portion forming the movable leg of the parallelogram, is in the form of the thin line cut.

The objective of obtaining as high a rigidity as possible, at least in the highly stressed parts, while keeping the size of the device as small as possible, is achieved if, in addition, the no-material portion, which delimits the solid portion forming the lever and its fulcrum on the side thereof that is directed toward the stationary member, is in the form of the thin line cut. Thus, between the lever and the stationary member, too, there is removed only a minimum of material, so that in connection with the measures described above where a minimum of space as attained by the thin line cuts is provided between the individual parts, the stationary member is separated by a minimum of space from one of the link members on the one hand and, on the other hand, by a minimum of space from the lever, the latter lever itself being separated from the other link member again by a minimum of space.

According to the invention, this embodiment may also be developed in such a manner that the reduction of the force is accomplished not only by means of one single lever, but by means of at least two series-connected levers serving to reduce the force. An embodiment of this type is characterized in that a second coupling member which connects the first lever with a rigid second lever serving to further reduce the force is provided at the end of the solid portion forming the lever, said end being opposite to the linkage section of the coupling member to the end of the lever directed toward the movable leg of the parallelogram and beyond the fulcrum of the lever, and in that the no-material portion separating the solid portion forming the second lever from the solid portion forming the first lever is in the form of the thin line cut. In this configuration thus the solid portions forming the two levers are disposed directly adjacent to each other on their mutually facing sides, and are separated there from each other only through the thin line cut. Again, there will occur no unnecessary losses of material that would unnecessarily weaken the loading capacity of the two levers.

In this context it is of great advantage if the no-material portion which separates the solid portion forming the second coupling member from the solid portion forming the second lever is in the form of the thin line cut. The second coupling member, which extends perpendicularly to the longitudinal direction of the two levers, thus can be separated on the side that is directed toward the second lever in the very same cutting procedure where the first lever becomes separated from the stationary member. In addition, the second coupling member is arranged here roughly within the space required in any case for the transverse extension of the second lever, so that the presence of the second coupling member does not cause any appreciable increase in the space required in the direction that is perpendicular to the longitudinal axis of the levers.

The second coupling member can be separated by removing a minimum of material also on the side that is directed toward the fixed leg of the parallelogram. For this purpose, in another advantageous refinement of the invention, the no-material portion which separates the solid portion forming the second coupling member on the side that faces away from the second lever from the solid portion forming the stationary member is in the form of the thin line cut.

It is also of great advantage if, in these embodiments of the invention, the no-material portion which separates the solid portion forming the second lever on the side that faces away from the first lever from the solid portion forming the stationary member is in the form of the thin line cut. It is evident that the solid portion available for the stationary member and the second lever in the direction that is perpendicular to the longitudinal direction of the levers and the link members thereby is left as large as possible, thus increasing the rigidity characteristics of these elements.

Apart from the idea of removing only a minimum of material in the no-material portions that separate the highest-stressed sections, in all embodiments described so far also the simplified manufacture of the force-reducing device by forming, as far as possible, the line cuts through continuous cutting, plays a role, so that the minimal amount of material removed through the thin line cuts is of advantage also in those portions where the load exerted on the individual parts of the device is smaller. Also in respect of this latter advantage it is useful if, in one further refinement of the invention, the no-material portion separating the solid portion forming the stationary member from the solid portion forming the second lever is in the form of the thin line cut, at least in its section delimiting the fulcrum of the second lever on the side that is directed toward the second coupling member, and in the following section extending as far as to the linkage section of the second coupling member to the second lever.

In particular, the invention and all of its special embodiments as laid down above may advantageously be used in devices wherein the flectional elasticity of each coupling member is concentrated in flectionally elastic domains of the solid block that are formed at its two localized linkage sections.

The same applies to devices wherein the flectional elasticity of the link members is achieved by means of flectionally elastic domains of the solid portions forming the link members, said flectionally elastic domains being located at the four corners of the parallelogram guide.

In this context, it has proved to be an important step that each line cut is formed by spark erosion at least in the region of the flectionally elastic domains. Spark erosion makes it possible to create particularly thin line cuts and, additionally, to give these line cuts practically any shape desired. Unlike known types of bending portions, where the latter are formed between adjacent cylindrical bores in the solid block and thus are bounded by the segments of circular lines, the spark-erosion method thus allows one to select an optimum shape of the bending portions different from circular boundaries.

For easy practicability of the spark-erosion method, the solid block has a bore for each continuous thin line cut, said bore being connected to each such line cut and serving to receive spark-erosion wire. These bores, representing an amount of removed material that is beyond the minimal amount of removed material, are of course arranged in such a way that they lie at a spot where no high demands on rigidity are made.

In all embodiments of the invention, the geometrical arrangement preferably is such that for each lever the linkage sections of the coupling members to the lever and the fulcrum of the lever are arranged on a common straight line oriented perpendicularly to the longitudinal direction of the coupling members. With such arrangement, where the points of force application to each lever and the fulcrum of each lever lie on a common straight line, the occurrence of measuring errors is lowest.

Also within the scope of the invention is the additional measure that a recess is formed in the solid block at, at least, one of the bending portions, said recess reducing the thickness of the solid block in the direction that is perpendicular to the plane of rotation of the levers. Especially in the case of devices with a plurality of levers and a high degree of force reduction, the forces acting upon the levers that are connected after the first lever are already decreased as a result of the force reduction to a high degree, so that the demands on the rigidity of the bending portions are lowered accordingly. Since on the other hand these subsequent levers and their coupling members undergo higher deflection it is desirable to further reduce the spring constants of the respective bending portions. This can easily be accomplished by the decrease in thickness caused by the recesses in the solid block which reduce the thickness of the material in the region of these bending portions. These recesses purposively are formed in symmetrical pairs with reference to the plane of rotation of the levers in the two opposite surfaces of the solid block.

Finally, in connection with all inventive embodiments an advantageous refinement is characterized in that, in the solid portion that forms the coupling member which is connected with the movable leg of the parallelogram, there is formed a recess between the linkage sections of said solid portion to the leg of the parallelogram and the lever, said recess reducing the thickness of the solid portion forming said coupling member in the direction that is perpendicular to the plane of the parallelogram guide. This recess, which too is purposively formed symmetrically in the two opposite surfaces of the solid block with reference to the plane of rotation of the levers, reduces the flexural strength of the coupling member, which mostly acts as a pull member, in the direction that is perpendicular to the plane of rotation of the levers, as well as reducing the torsional rigidity thereof, so that any deviations caused by an off-center application of the force to be measured to the movable leg of the parallelogram are taken up at the recess of the coupling member and will not be transmitted to the lever which is connected to the coupling member. Thereby, the system is less susceptible to errors caused by an off-center application of the load.

In another aspect of the invention a device for reducing the force in a force-measuring apparatus, in particular in a scale, having at least one rigid lever supported by a stationary member and serving to reduce the force, in which the stationary member and the lever are formed by solid portions of a single-piece solid block, said solid portions being bounded by portions of no material, which are formed by recesses extending through the solid block perpendicularly to the plane of rotation of the lever, of which the solid portion forming the lever is linked to the solid portion forming the stationary member only via a bending portion formed in the solid block and representing the fulcrum, wherein an electromagnetic force-compensating system having a compensating coil movable in a magnetic field produced by a stationary magnet arrangement is provided, said compensating coil being supported on the free arm of the respective lever supplying the reduced force, and being balanced by a regulating circuit for the compensating current of the force-compensating system in a zero-position in respect of the force to be measured, is developed according to the invention in such a way that the magnet arrangement is supported on the solid portion forming the stationary member.

This aspect takes account of the fact that—even with a very large dimensioning of the solid portion that forms the stationary member—in particular in case of relatively high input forces, that is in the case of a scale of high nominal loads, the forces transmitted to the stationary member at the fulcrums of the levers still might cause the solid portion that forms the stationary member to minimally deflect in the direction of force application, which forces still influence the very high accuracy that can be attained with measuring systems with electromagnetic force compensation. Namely, as a result of such a minimal deflection of the stationary member, the position of the fulcrum, or fulcrums, of the lever, or levers, would slightly change, thus involving a change in the zero-position between the compensating coil and the stationary magnet arrangement. Since, according to the invention, the magnet arrangement is supported on the solid portion that forms the stationary member, the magnet arrangement follows the deflection of the stationary member and, thus, the change in position of the fulcrums of the lever arrangement carrying the compensating coil, so that the relative positional relationship between the compensating coil and the magnet arrangement is maintained and no undesirable changes in the zero-position will happen.

In view of an advantageous spatial arrangement, one preferred embodiment realizing this idea is characterized in that the magnet arrangement is supported on one end of a bracket extending parallel to the plane of rotation of the lever and projecting via said one end beyond the solid block, with its other end being mounted to the stationary member. In particular in designs where the force-reducing device is embedded in a parallelogram guide or is formed in one piece with such a parallelogram guide, the force-compensating system then can be arranged outside the solid block near the movable leg of the parallelogram.

In this respect, for stably supporting the magnet arrangement it is particularly advantageous if the bracket is in the shape of a "U", and in that the solid block is disposed between the two legs of the "U".

Similarly, suspension of the compensating coil in the magnetic field produced by the magnet arrangement is effected advantageously in that the compensating coil is supported on one end of a bracket extending parallel to the plane of rotation of the lever and projecting beyond the solid block via said one end, with its other end being mounted to the free arm of the lever supplying the reduced force.

Also in this case it is of special advantage to the stable support of the compensating coil if the bracket is in the shape of a "U", and in that the solid block is disposed between the two legs of the "U".

Figure 2:
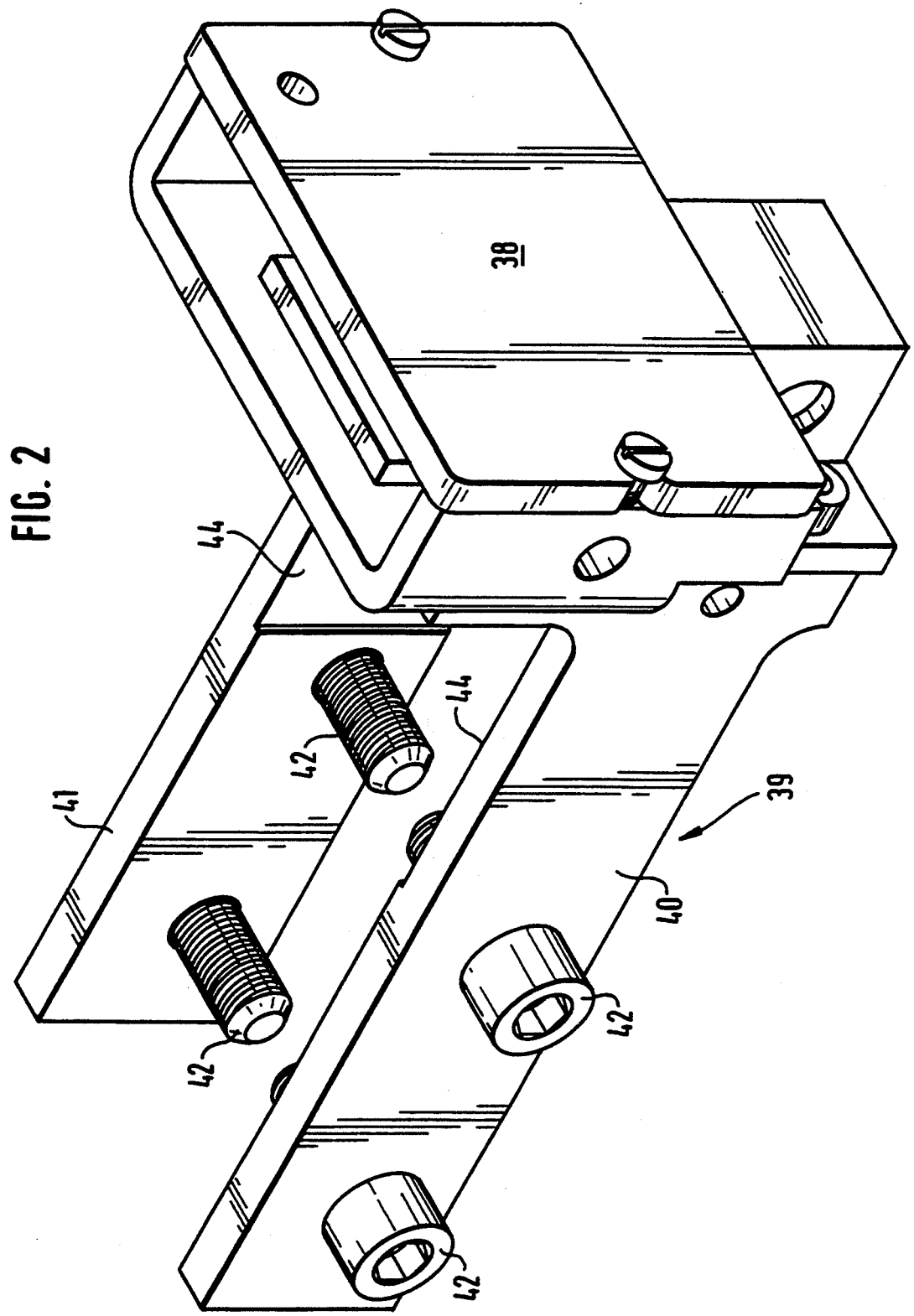
Figure 3:
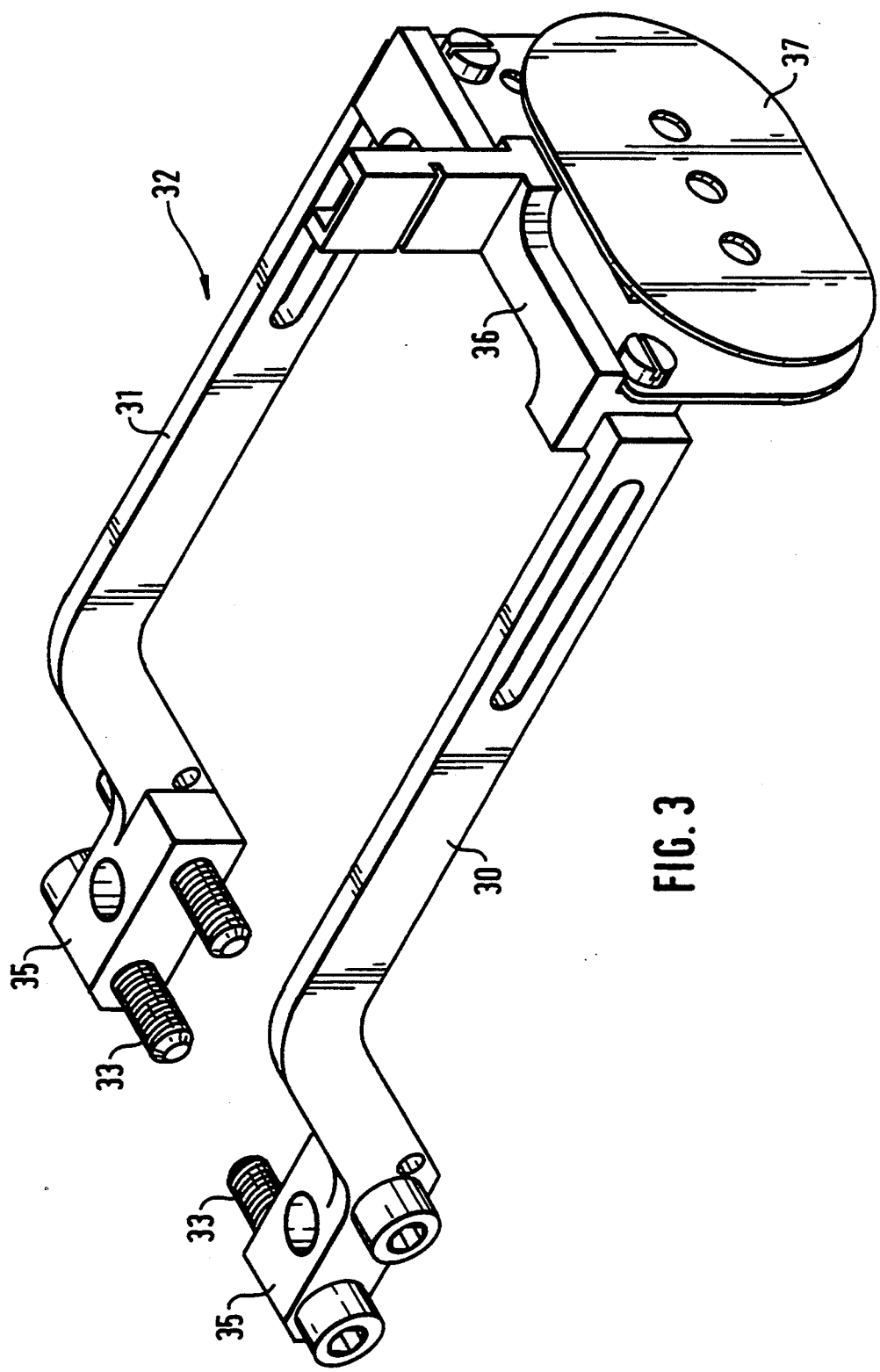
Figure 4:
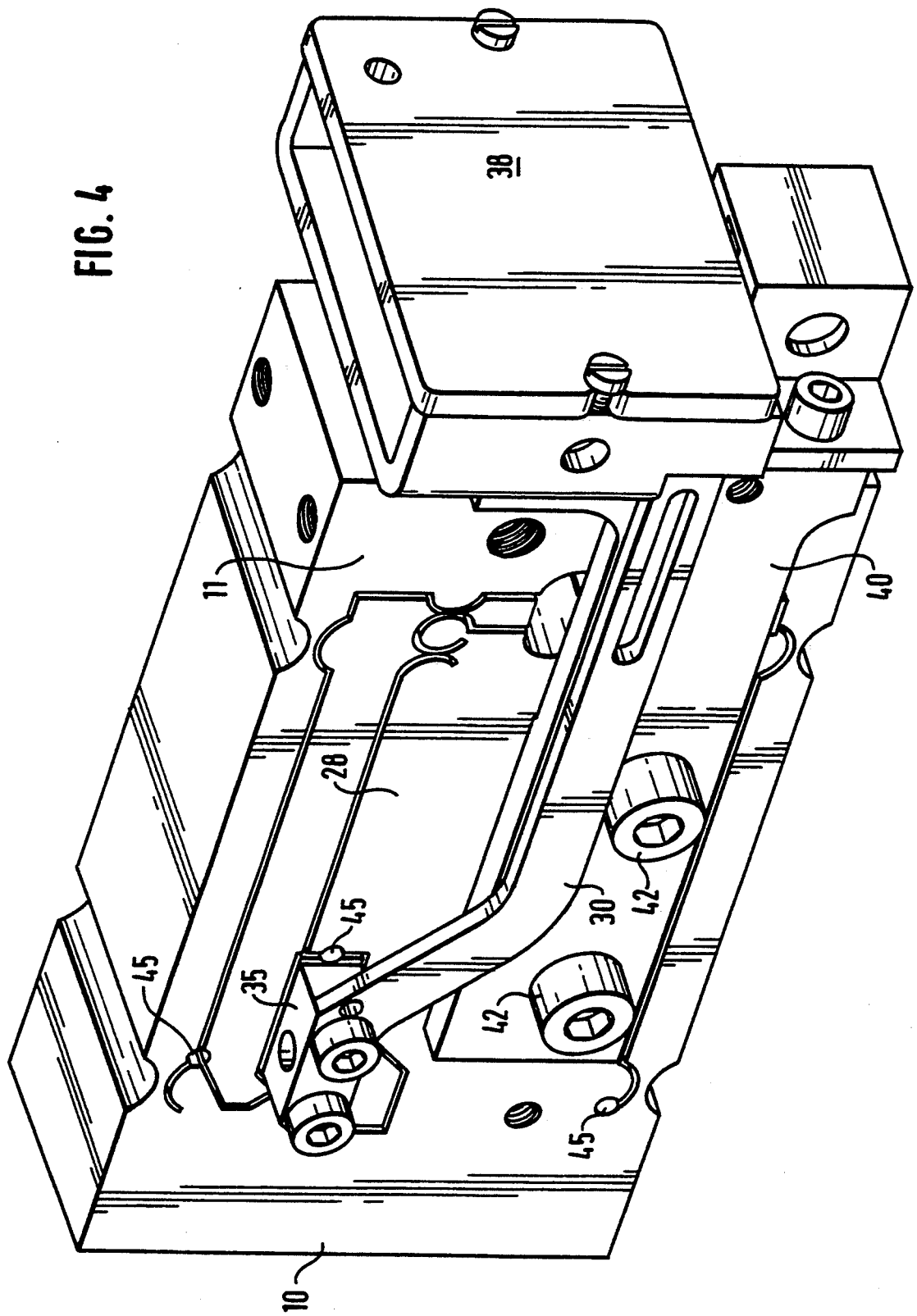
Figure 5:
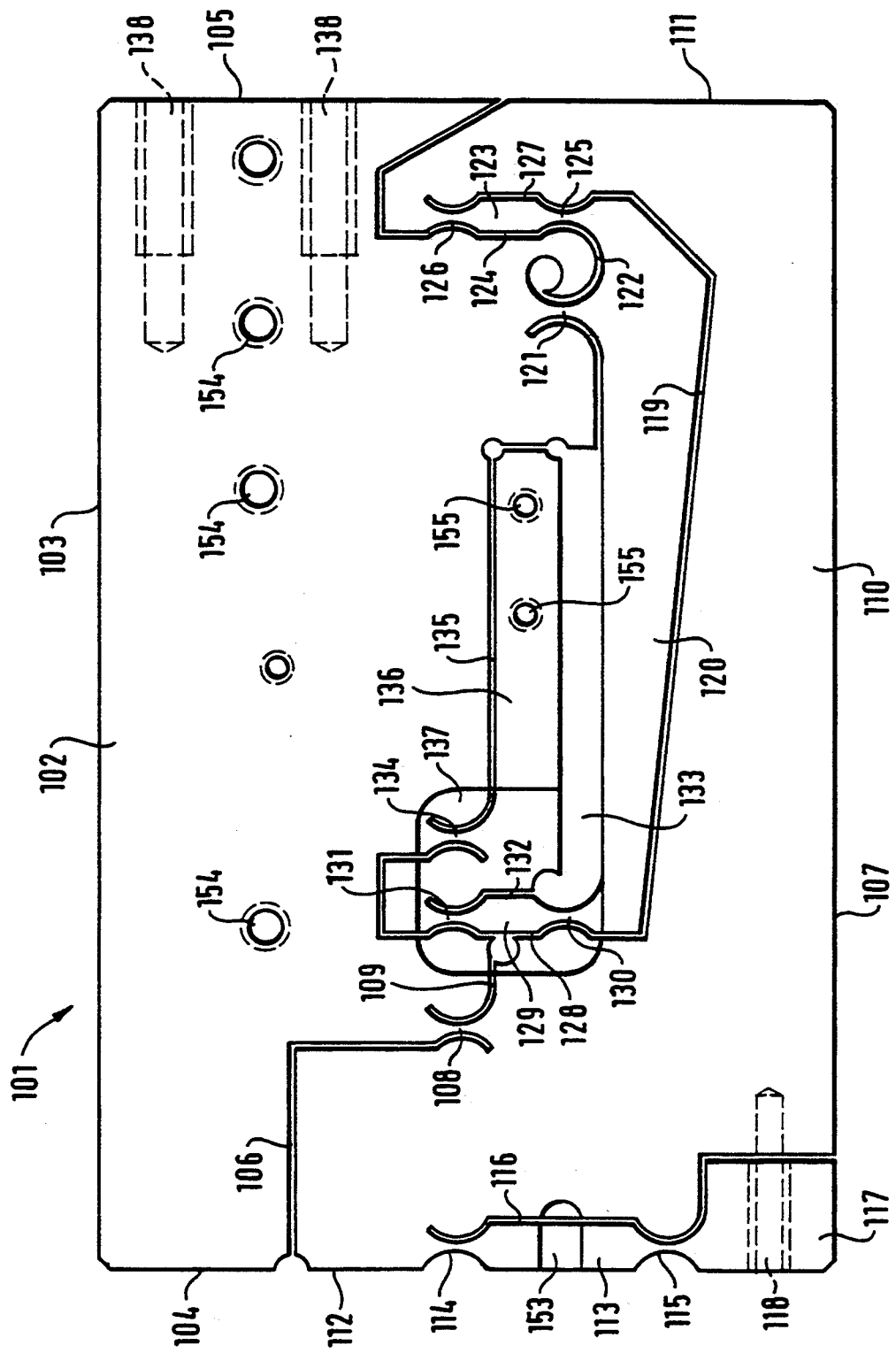
Figure 6:
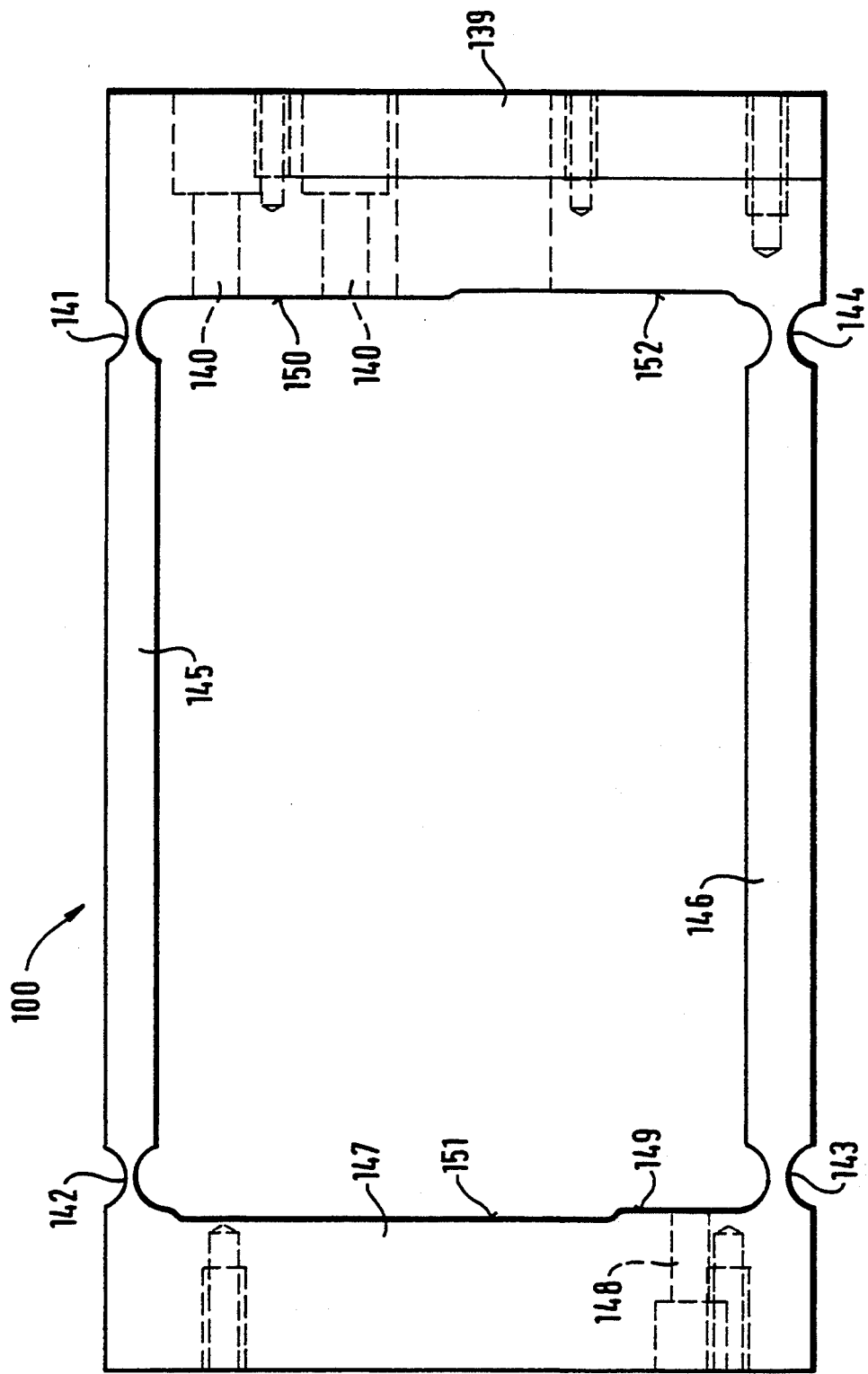

Additional features, details and advantages of the invention will be apparent from the following description and the drawings, all features of the drawings not expressly mentioned in the text being incorporated herein by reference for purposes of disclosure of the invention, wherein:

FIG. 1 shows an embodiment of a force-reducing device which is formed in one piece with a parallelogram guide and has two levers for reducing the force, FIG. 2 shows a bracket for supporting the magnet arrangement and the position transmitter of a force-compensating system in the embodiment of FIG. 1, FIG. 3 shows a bracket for supporting the compensating coil of the force-compensating system in the embodiment of FIG. 1, and FIG. 4 is a view of the embodiment shown in FIG. 1 with the component parts of the force-compensating system shown in FIGS. 2 and 3 being mounted to the device, FIG. 5 is a side plan view of an embodiment of the force-reducing device with three levers, FIG. 6 shows a parallelogram guide for receiving the embodiment of the force-reducing device as illustrated in FIG. 5, and FIG. 7 shows an embodiment of the force-reducing device with three levers, being formed in one piece with the parallelogram guide.

As seen from FIGS. 1, 4 5 and 7, in each of the embodiments illustrated in the drawings a single-piece solid block 1 or 101, respectively, is subdivided into a plurality of solid portions which are bounded by no-material portions within the solid block 1 or 101. These no-material portions are formed by cutouts in the solid block 1 or 101, respectively, which run through the whole of the solid block perpendicularly to its principal plane directed toward the viewer in the figures. As described in detail hereinbelow, these no-material portions are in the form of thin line cuts as can be obtained by removing a minimum of material, at least in those sections where the solid portions which they define are subjected to very high loads of force as viewed in the direction of the principal plane. The width of the thin line cut is, for example, only some tenths of a millimeter, measured in the direction of the principal plane. Such thin line cuts may, for example, be produced through the spark-erosion method by means of erosion wire. Suitable materials for the single-piece solid block 1 or 101, respectively, are for instance aluminum alloys. But also a great number of other materials may be suitable, such as steel alloys or compound materials.

In the special embodiment of FIGS. 1 to 4, first of all two solid portions 2, 3 are formed which each extend along the two longer edges of the rectangle, said edges being parallel to each other. Each solid portion 2, 3 is delimited on one side by the respective outer edge of the rectangular solid block 1 and, on its inner side, by the no-material portions 4 and 5, respectively. The no-material portions 4, 5, which extend parallel to the two longer edges of the rectangle in the form of the thin line cut, are convexly arched in the end portion of the no-material portions 4, 5 toward the respective adjacent longitudinal edge of the solid block 1. In contrast to these convex arches of the no-material portions 4, 5, the solid block 1 has complementary concave arches whereby the thin areas of the solid block formed between the mutually facing concave and convex arches serve as bending portions 6, 7, 8 and 9.

The four bending portions 6, 7, 8 and 9 lie within the solid block 1 on the four corners of a parallelogram, so that both the solid portion 2 extending between the bending portions 6 and 7 and the solid portion 3 extending between the bending portions 8 and 9 each form one link member of the parallelogram. Between the bending portions 6 and 9 there is a solid portion 10 which forms a fixed leg of the parallelogram and extends transversely to the longitudinal direction of the solid portions 2, 3 forming the link members of the parallelogram, whereas the solid portion 11 opposite to the solid portion 10 beyond the other bending portions 7, 8 represents a movable leg of the parallelogram. The force to be measured, for example the force of a weight to be weighed, is applied to this movable leg 11 of the parallelogram in the longitudinal direction of the movable leg 11 of the parallelogram, i. e. transversely to the longitudinal direction of the link members 2, 3, while the opposite fixed leg 10 of the parallelogram is fixed to a shelf not shown in the drawings.

The solid portion that represents the movable leg 11 of the parallelogram and is delimited on one side by the shorter edge of the rectangle extending transversely to the longer edges of the rectangle is delimited on its other side directed toward the interior of the solid block 1 by a no-material portion 12. This no-material portion 12 extends parallel to this shorter edge of the rectangle and is also in the form of the thin line cut and is convexly arched at two locations spaced from each other at a distance, toward the fixed leg 10 of the parallelogram. While ending on the one hand with the convex arch directed toward the bending portion 8, on the other hand the no-material portion 12 is connected with the no-material portion 4 beyond the convex arch facing the bending portion 7.

Opposed to the two convex arches of the no-material portion 12 are two complementary arches which are convex toward the movable leg 11 of the parallelogram, which arches form part of a no-material portion 13 otherwise extending parallel to the no-material portion 12. The no-material portion 13 is extended beyond its arch directed to the bending portion 8, up to the no-material portion 5 limiting the link member 3, while being curvedly extended beyond its other arch directed toward the bending portion 7 until it defines a bending portion 14 at the side of the arch which is directed to the movable leg 11 of the parallelogram, said bending portion 14 serving as a fulcrum for a lever.

The no-material portions 12 and 13, whose concave arches are opposed to each other in pairs wherebetween thin areas of the solid block 1 representing bending portions 15, 16 are formed, thus define a solid portion between them which forms a first coupling member 17. The bending portion 16 forms the linkage section of the first coupling member 17 to the movable leg 11 of the parallelogram, and the bending portion 15 forms its linkage section to a first lever 18. This first lever 18, which will be described in more detail below, is perpendicularly supported on the bending portion 14 acting as a fulcrum and delimited on one side by the no-material portion 13.

This first lever 18, which extends alongside the solid portion that forms the link member 2 and which is separated from the latter only by the no-material portion 4 in the form of the thin line cut, is separated from the solid block 1 between the bending portion 15 forming the linkage section of the first coupling member 17 and the bending portion 14, on the side that is opposed to the link member 2, by the section of the no-material portion 13 which extends therebetween. Another no-material portion 19 extending parallel to the no-material portion 4, which is in the form of a thin line cut, too, separates the first lever 18 from the single-piece solid block 1 on the side of the bending portion 14 that is opposed to the bending portion 15. This no-material portion 19 ends at one end in an arched portion defining the bending portion 14 and changes at its opposite end into a no-material portion 20 extending in the longitudinal direction of the fixed leg 10 of the parallelogram, which no-material portion 20, similarly to the no-material portion 12, delimits a second coupling member 21 on the side that is directed to the movable leg 11 of the parallelogram, and, similarly to the no-material portion 12, has sections for defining bending portions 22, 23 which are spaced from each other at a distance and are convexly bent toward the fixed leg 10 of the parallelogram. On the side that is directed to the fixed leg 10 of the parallelogram, the second coupling member 21 is delimited by a no-material portion 24 which extends complementary to the course of the no-material portion 20, thus also extending in the longitudinal direction of the fixed leg 10 of the parallelogram and having the arches that serve to define the bending portions 22, 23. Beyond the bending portion 22, which represents the linkage section of the second coupling member 21 to the first lever 18, there extends the no-material portion 24, being also in the form of the thin line cut, until it reaches the no-material portion 4 which it joins at the end of the bending portion 6 that is directed toward the bending portion 7.

The no-material portion 24 first of all again extends away from the bending portion 23 opposed to the bending portion 22 in the form of the thin line cut in parallel with the longitudinal direction of the first lever 18, and then ends in an arched curve directed with one end toward the first lever 18, said arched curve defining a bending portion 26 serving as a fulcrum for a second lever 25 on the side that is directed toward the second coupling member 21. The no-material portion 27, which separates the bending portion 26 from the single-piece solid block 1 on its other side directed toward the fixed leg 10 of the parallelogram, extends from its arched section delimiting the bending portion 26 away from the first lever 18 over some distance in the longitudinal direction of the fixed leg 10 of the parallelogram, and then in parallel with the longitudinal direction of the first lever 18 beyond the bending portion 23 forming the linkage section of the second coupling member 21 and, then, in a succession of an inclined section, a section that is parallel to the longitudinal direction of the first lever 18 and, finally, a section that is perpendicular to the longitudinal direction of the first lever 18 until it joins the no-material portion 19.

Thus, between the no-material portion 27 which delimits the second lever 25 on the side that faces away from the first lever 18, the section of the no-material portion 19 that extends therefrom to the first coupling member 17, the no-material portion 13 delimiting the first coupling member 17, and the no-material portion 5 delimiting the link member 3, a solid portion 28 is defined which is connected in one piece with the solid portion 10 forming the fixed leg of the parallelogram and forms thus a stationary member.

It is evident that, in this configuration, the first and second lever 18 and 25, respectively, are perpendicularly supported against the stationary member 28 by means of the bending portions 14 and 26, respectively. The force to be measured, which is exerted on the movable leg 11 of the parallelogram, acts as a tie force upon the first coupling member 17 connected therewith via the bending portion 16, which coupling member itself acts upon the first lever 18 via the bending portions 15. Thereby, the first lever 18 reduces the force in relation to the lengths of its arms which are determined by the distance between the bending portion 15 and the bending portion 14 serving as a fulcrum on the one hand and, on the other hand, the bending portion 14 and the bending portion 22 serving as the linkage section of the second coupling member 21. The reduced force is transmitted to the second lever 25 through the second coupling member 21 becoming active as a result of the tensile force via the bending portion 23 acting as the linkage section to the second lever 25.

The free ends of the legs 30, 31 of a U-shaped bracket 32 illustrated in FIG. 3 are fixed on the free lever arm 29 of the second lever 25 which is opposite to the bending portion 26 beyond the bending portion 23, i. e. on its outer surfaces lying in the two principal surfaces of the single-piece solid block 1 by means of screw bolts 33 engaged in threaded bores 34 of the free lever arm 29, as shown in FIG. 4. Lateral distance pieces 35 secure, in the manner shown in particular in FIG. 4, that the solid block 1 is received with sufficient lateral distance in the interior of the U-shaped bracket 32 with regard to the portions of the solid block 1 that lie outside the contacting surfaces of the distance pieces 35 with the free lever arm 29, so that the legs 30, 31 of the "U" will be able to follow the movement of the second lever 25 without grazing the solid block 1.

A compensating coil 37 for a force-compensating system is mounted to the segment 36 of the "U" that connects the legs 30, 31 of the "U". This compensating coil 37 is suspended by means of the bracket 32 in a magnetic field produced by a magnet arrangement 38 shown in FIGS. 2 and 4. The compensating current for the force-compensating system comprising the compensating coil 37 and the magnet arrangement 38 is controlled by a control circuit in such a manner that the compensating coil 37 is always returned to its zero-position, with a position signal for the compensating coil 37 supplied by a position sensor serving as an input variable for the control circuit. Thus, the compensating current represents a signal indicating the force to be measured.

As seen from FIGS. 2 and 4, the magnet arrangement 38 as well as a position sensor (not shown in the drawings) detecting the relative position of the compensating coil 37 with regard to the magnet arrangement 38 is disposed at a U-shaped bracket 39 in the region of its segment connecting the two legs of the "U", while the legs 40, 41 of the bracket 39 extend away from the connecting segment of the "U" which is disposed outside the solid block 1 near the movable leg 11 of the parallelogram along the two principal planes of the solid block 1 and then to a point which is near the fixed leg 10 of the parallelogram. The legs 40, 41 of the "U" abut the solid portion 28 forming the stationary member, and are fixed to it by means of screw bolts 42 engaged in threaded bores 43. The legs 40, 41 of the "U"

each are provided on their inner surfaces facing the solid block 1 in the region of the movable leg 11 of the parallelogram with a recess 44 which is slightly recessed relative to the surface of the solid block 1, whereby the movable leg 11 of the parallelogram is able to freely move with regard to the legs 40, 41 of the "U".

Thus, through the two brackets 32 and 39 for the compensating coil 37 and the magnet arrangement, respectively, which project beyond the solid block 1 on the side of the movable leg 11 of the parallelogram, these parts of the force-compensating system are disposed outside the solid block 1 on the side of the movable leg 11 of the parallelogram. If the stationary member 28 slightly bends under high load in spite of the minimal removal of material as achieved by the no-material portions being in the form of thin line cuts, and in spite of the resultant high rigidity of the stationary member 28, the bracket 39, and thus the magnet arrangement 38, will follow this dislocation. In particular, in case of such bending also the bending portion 26 serving as the fulcrum of the second lever 25 will at the same time follow this dislocation, so that the compensating coil 37 will also follow the dislocation as the bracket 32 carrying the compensating coil 37 is connected with the second lever 25, and consequently the relative zero-position between the compensating coil 37 and the magnet arrangement 38 will be maintained.

While, above all, it is important for the no-material portions 4, 5, 19, 20 and 27 defining the individual parts such as the stationary member 28 and the two levers 18, 25 to be in the form of thin line cuts at least in the sections where the highest loads are exerted on the parts they delimit, in the embodiment illustrated in FIGS. 1 to 4 these no-material portions are in the form of thin line cuts throughout their full length, so that these thin line cuts can be manufactured in a uniform cutting-process, for instance through spark-erosion. Holes 45 also shown in FIGS. 1 and 4, which enlarge the no-material portions at some spots, merely serve to facilitate the insertion of the spark-erosion wire, these holes 45 evidently being located at places where they do not cause any weakening of the material which affects the rigidity of the system.

Finally, according to FIG. 1, the first coupling member 17 has two recesses 46 each formed in the two principal planes of the rectangular solid block 1 between the bending portions 15 and 16 in the middle of its longitudinal extent, whereby the thickness of the first coupling member 17 is reduced perpendicularly to these principal planes which form the plane of the parallelogram. As a result of the thus achieved flexibility of the first coupling member 17 in the direction that is perpendicular to the plane of the parallelogram, thus any minor tilting of the movable leg 11 of the parallelogram caused by any off-center application of the force to be measured is taken up by the first coupling member 17 and will not be transmitted to the levers 18,25.

While in the embodiment described above and illustrated in FIGS. 1 to 4 the force-reducing device has a parallelogram guide formed in one piece therewith, with the force-reduction being accomplished in two stages by two levers, in the further embodiment of FIG. 5 the force-reduction is accomplished in three stages, which configuration is suitable for being fitted into a separately formed parallelogram guide 100 shown in FIG. 6. A cuboid-shaped single-piece solid block 101, which is illustrated in FIG. 5 with its principal plane lying in the plane of the drawing, has a solid portion 102 which serves as a stationary member and is defined by the upper edge 103 of the solid block of FIG. 5, sections 104, 105 of the lateral edges of the solid block 101 following said upper edge 103, and by no-material portions in the solid block 101 to be described in more detail hereinbelow.

A no-material portion 106 extends away from the end of the section 104, whose length is about one-third of the entire shorter lateral-edge length of FIG. 5, and then first of all parallel to the upper edge 103 which is perpendicular to the shorter lateral edge, over about one-fifth of the length of the upper edge 103. Then, the no-material portion 106 further extends parallel to the lateral-edge section 104 toward the lower edge 107 of the solid block 101 which is parallel to the upper edge 103 and ends roughly in the middle between the upper edge 103, and the lower edge 104 in a section that is convexly arched toward the lateral-edge section 105 and delimits a bending portion 108 on the side that is directed toward the lateral-edge section 104. On its other side, the bending portion 108 is separated by a complementarily arched section of a no-material portion 109 from the solid portion 102 forming the stationary member, with the no-material portion 109 extending over a short distance at the end of its section delimiting the bending portion 108, which end is directed toward the lower edge 107 in parallel with the lower edge 107. The bending portion 108 serves as a fulcrum on which a solid portion forming a first lever 110 is suspended, said solid portion being separated from the solid portion 102 which forms the stationary member by means of the no-material portions 106 and 109.

On the side that is opposite to the bending portion 108, the first lever 110, which extends in parallel with the lower edge 107 in its longitudinal direction, is delimited by the lower edge 107 of the solid block 101 and, away from the right end of the lower edge 107 of FIG. 5, by the section 111 of the lateral edge that is perpendicular to the lower edge 107, with the lateral-edge section 111 delimiting the first lever 110 extending roughly up to the midpoint of this lateral edge where the section 105 ends.

The left lateral edge of FIG. 5, which is opposite to the right lateral edge consisting of the lateral-edge sections 105 and 111, delimits in its lateral-edge section 112 which begins at the connecting portion of the no-material portion 106 with the lateral-edge section 104 the first lever 110 as well as a first coupling member 113 formed in the portion adjacent to the lateral-edge section 112. For this purpose, the lateral-edge section 112 is provided at two locations that are spaced from each other by a distance with arches which are curved convexly toward the lateral-edge sections 105, 111, said convex arches delimiting bending portions forming the linkage sections of the first coupling member 113 on the side that is directed toward the outer surface of the solid block 101. On the side that is directed toward the interior of the solid block 101, the solid portion representing the first coupling member 113 is separated from the solid portion that represents the first lever 110 by a no-material portion 116 extending parallel to the part of the lateral-edge section 112 that lies between the bending portions 114, 115, which no-material portion 116 after its parallel course has sections on both sides that are arched complementarily to the arches of the lateral-edge section 114, so as to delimit the bending portions 114, 115 on the side that is directed toward the first lever 110 as thin areas of the solid block 101. The no-material portion 116 extends away from the end of its arched section that is closest to the lower edge 107 in parallel with the lower edge 107 over a short distance, and then extends parallel to the lateral-edge sections 104, 112 down to the lower edge 107, where it leaves the solid block 101. By virtue of this course of the no-material portion 116, an anchoring portion 117 becomes separated from the solid block 101 below the bending portion 115 which is closest to the lower edge 107, which anchoring portion 117 is connected with the first coupling member 113 only via the bending portion 115. This anchoring portion 117 is provided with a threaded bore 118 running parallel to the lower edge 107 and serving to fix the anchoring portion 117 to the parallelogram guide 100.

A no-material portion 119 delimiting the first lever 110 on the side that faces away from the lower edge 107 at the same time delimits a second lever 120 directly adjacent the first lever 110, said second lever 120 being suspended on the side facing away from the first lever 110 on the solid portion that represents the stationary member 102. The fulcrum of the second lever 120 also is formed by a bending portion 121 which is represented by a thin area of the solid block 101 and located near the end portion of the first lever 110 adjacent the lateral-edge section 111. On the side that is directed toward the lateral-edge section 111, the bending portion 121 is delimited by a section of a no-material portion 122 which is arched convexly toward the lateral-edge section 112 and whose convex arch that is curved convexly toward the lower edge 107 changes into a section 124 delimiting a second coupling member 123 on the side that is directed toward the lateral-edge section 112.

As in the case of the first coupling member 113, the section 124 of the no-material portion 122 delimiting the second coupling member 123 is, apart from its course that otherwise is parallel to the lateral-edge sections 105, 111, provided at two locations spaced from each other by a distance with arches which are curved convexly toward the lateral-edge sections 105, 111 and delimit in the way described above with reference to the first coupling member 113 bending portions 125, 126 serving as linkage sections of the second coupling member 123. The bending portion 126 which is closer to the upper edge 103 is followed by the section 124 of the no-material portion 122 which extends over a short distance in parallel with the lateral-edge sections 105, 111 and then, after extending parallel to the lower edge 107, extends obliquely toward the lower edge 107 down to the connecting portion of the lateral-edge sections 105 and 111.

A no-material portion 127, which delimits the second coupling member 123 on the side that is directed toward the lateral-edge section 111, has a course that is complementary to the section 124 of the no-material portion 119 in the region of the second coupling member 123 by extending away from an arch delimiting the bending portion 126 which is closer to the upper edge 103 in parallel to the lateral-edge section 111, then forming a complementary arch delimiting the bending portion 125 which is closer to the lower lateral edge 107. After that, the no-material portion 127 first of all extends parallel to the lateral-edge section 111 over some distance and then extends obliquely towards the opposite lateral-edge section 112 down to the no-material portion 119. Thus, between the no-material portion 127 and the lateral-edge section 111 there is defined an end portion of the first lever 110 which considerably exceeds the transverse extent of the longitudinal arm of the first lever 110 defined between the no-material portion 119 and the lower edge, with the second coupling member 123 being separated from said end portion by the no-material portion 127.

The second lever 120 thus extends away from the bending portion 125 forming the linkage section of the second coupling member 123 and beyond the bending portion 121 serving as the fulcrum in the direction of the lower edge 107 to a position which is near to the bending portion 108 serving as a fulcrum of the first lever 110. Due to the course of the no-material portion 119 separating the second lever 120 from the first lever 110, which is inclined relative to the direction of the lower edge 107, the second lever 120 is tapered towards its one end that is directed toward the bending portion 108, whereas the first lever 110 is tapered toward its one end that is located at the second coupling member 123. Since it is only the reduced force that is applied to each of the tapered arms of the first and the second lever 110 and 120, respectively, the thickness can be reduced there, resulting in an increased thickness of those parts of the first and the second lever 110 and 120, respectively, where the force to be reduced is applied via the first and the second coupling member 113, 123, respectively.

The end of the no-material portion 119 extending obliquely to the direction of the lower edge 107, which is directed toward the bending portion 108, is followed by a no-material portion 128 which extends perpendicularly to the lower edge 107, i. e. parallel to the lateral-edge sections 104,112, and is joined also by the end of the no-material portion 109 facing away from the bending portion 108. As in the case of the no-material portions 116, 124 and 127 which delimit the first coupling member 113 and the second coupling member 123, the no-material portion 128 likewise delimits a third coupling member 129 on the side that is directed toward the lateral-edge section 112, and is provided with two sections spaced from each other at a distance, which are convexly curved toward the lateral-edge section 111 and define bending portions 130,131 on the side that is directed toward the lateral edge 112, with the no-material portion 109 joining the no-material portion 128 between the bending portions 130,131. The third coupling member 129 is delimited on the side that is directed toward the lateral-edge section 111 by a no-material portion 132 which extends complementarily to the no-material portion 128 in the region of the third coupling member 129 and the bending portions 130,131. As described several times above, this no-material portion 132 is provided with arched sections that delimit the bending portions 130,131 on the side that is directed toward the lateral-edge section 111, and are complementary to the arched sections of the no-material portion 128.

The no-material portion 132 extends away from the bending portion 130, which is located closer to the lower edge 107 and serves as the linkage section for the third coupling member 129 to the second lever 120, and then joins a no-material portion 133 which delimits the second lever 120 on the side that faces away from the no-material portion 119 and extends as far as to the bending portion 121 serving as the fulcrum for the second lever 120, said no-material portion 133 delimiting the bending portion 121 on the side that is directed toward the lateral-edge section 112 from the solid portion 102 forming the stationary member. In contrast to that, the no-material portion 128, which delimits the third coupling member 129 on the side that is directed toward the lateral-edge section 112, extends away from the bending portion 131 and in parallel with the lateral-edge section 112 over some distance, and then in parallel with the lower edge 107 over some distance and, finally, again in parallel with the lateral-edge section 112 toward the lower edge 107, forming an end section which is curved convexly toward the lateral-edge section 111. This arched end section defines a bending portion 134 on the side that is directed toward the lateral-edge section 112, which bending portion 134 is delimited on its opposite side by a no-material portion 135 which forms a complementarily arched end section and then extends parallel to the lower edge 107 to a location which is spaced at a distance from the bending portion 121 serving as fulcrum for the second lever 120 and, finally, joins the no-material portion 133 by a parallel section. Thus, the no-material portions 133 and 135 define between each other a third lever 136 which otherwise is separated from the stationary member 102 by the section of the no-material portion 128 that extends away from the bending portion 131 serving as the linkage section for the third coupling member 129 to the third lever 136 and to the bending portion 134 serving as the fulcrum on which the third lever 136 is suspended.

As the force to be measured is applied at the bending portion 114 to the first lever 110 by means of the first coupling member 113, it is of special importance to the no-material portions 116 and 106 to be in the form of the thin line cuts, at least in the sections which define the bending portions 114 and 108, in order that the solid volume of the highest-loaded force-applying arm of the first lever 110 is as large as possible. Moreover, in the embodiment shown in FIG. 5 also the remaining sections of the no-material portions 106 and 116 as well as the other no-material portions 109, 119, 122, 124, 127, 128, 132 and 135 (except the no-material portion 133) are entirely in the form of the thin lines. The no-material portion 133 is of a considerably larger width than the gap width of the thin lines merely in its section between the first lever 120 and the third lever 136. This is, on the one hand, possible without any loss of rigidity because of the small load exerted on the third lever 136 as a result of the high reduction and, on the other hand, is of advantage for such a weight compensation of the third lever 136 as there exists an absolute balance between the input side and the output side within the entire lever arrangement.

As seen further from FIG. 5, in case of each lever 110, 120 and 136 the bending portions 108, 121 or 134, respectively, serving as fulcrums are arranged on a straight line with the bending portions 114 and 126 or 125 and 130 or 131, respectively, which form the linkage sections of the respective coupling members to the respective levers, said straight line extending parallel to the lower edge 107. As seen further from FIG. 5, the ratio of reduction of the first lever 110, which is determined by the relation of the distances between the bending portion 108 and the bending portion 114 on the one hand, and the bending portion 108 and the bending portion 126 on the other hand, is smaller than the ratio of reduction of the second lever 120 and of the third lever 136, of which the ratio of reduction of the second lever 120 is determined by the relation of the distances between the bending portion 121 and the bending portion 125 on the one hand, and the bending portion 121 and the bending portion 130 on the other hand. The rigidity demands in the region of the highest-stressed first lever 110 can better be complied with if the ratio of reduction of the first lever 110 is restricted to a value, for example below ten, which is smaller than the ratios of reduction of the other levers 120 and 136.

As finally seen from FIG. 5, recesses 137 are formed in the region of each bending portion 130, 131 and 134 in the solid block 102, which begin at the principal surfaces of the latter, these principal surfaces being parallel to the plane of rotation of the levers. These recesses 137 reduce the thickness of the solid block 102 in the direction that is perpendicular to the principal planes of the latter, i. e. to the plane of rotation of the levers. This reduction serves to adapt the spring constants of the bending portions 130, 131 and 134 which are exposed only to the force that has been reduced by the first lever 110 and the second lever 120.

According to FIG. 5, in the solid portion 102 forming the stationary member two threaded bores 138 are formed, which extend away from the lateral-edge section 105 being perpendicular to the principal plane, into the solid block 101. The single-piece parallelogram guide illustrated in FIG. 6 has two through-bores 140 which are congruent with the threaded bores 138 and are formed in the fixed leg 139 of the parallelogram, said leg being mounted on a shelf in a manner not shown in the drawings. By means of these through-bores 140, the solid block 102 is fixed in the interior of the parallelogram guide 100 to the fixed leg 139 of the parallelogram by means of screw bolts engaged in the trough-bores 140. The movable leg 147 of the parallelogram, which is linked to the fixed leg 139 of the parallelogram via link members 145,146 of the parallelogram having bending portions 141 to 144, is provided with a through-bore 148 which is in alignment with the threaded bore 118 of the anchoring portion 117 of the first coupling member 113, whereby the first coupling member 113 can be fixed to the movable leg 147 of the parallelogram by means of a screw bolt.

Beyond the surface 149 abutting the anchoring portion 117 of the first coupling member 113 as well as beyond the surface 150 abutting the lateral edge 105 of the solid portion 102 forming the stationary member, the surfaces 151 and 152, respectively, of the movable leg 147 and the fixed leg 139, respectively, of the parallelogram, which is directed toward the interior of the parallelogram, is slightly set back as viewed from the plane of the parallelogram, so that there is sufficient free space for movement of the force-reduction element 101 formed by the solid block. Similarly, the upper edge 103 and the lower edge 107 are spaced from the inner surfaces of the link members 145 and 146 of the parallelogram facing these edges at a small distance.

As described above with reference to the recess 46 with the embodiment illustrated in FIGS. 1 to 4, also the first coupling member 113 has central recesses 153 between its linkage sections 114 and 115 extending inwardly from each of the two principal planes of the solid block 101, which decreases the thickness perpendicularly to the principal planes. This reduction in thickness serves, in the manner described above, to decouple the force-reduction device from any tilting of the movable leg 147 of the parallelogram as a result of any off-center application of load.

Threaded bores 154, which are formed in the solid portion 102 forming the stationary member and extend inwardly from the principal planes in accordance with the embodiment of FIG. 5, serve in the manner described above with reference to FIGS. 1 to 4 to fasten a bracket not shown in the drawings, which carries the magnet arrangement of the force-compensating system. Also, a bracket carrying the compensating coil is fastened to the free lever arm of the third lever 136 by means of screw bolts engaged in threaded bores 155 in the way described with reference to the embodiment of FIGS. 1 and 4. The ratio of reduction of this third lever 136 thus is determined by the relation of the distances between the bending portions 131 and 134 on the one hand, and the bending portion 134 to the end of the bracket carrying the compensating coil on the other hand.

Finally, FIG. 5 also shows insertion holes not specifically designated by reference numerals which correspond to the insertion holes 45 of the embodiment shown in FIGS. 1 to 4 and through which the spark-erosion wire serving to produce the thin line cuts is inserted.

The embodiment shown in FIG. 7 corresponds, with a few exceptions, to the embodiment shown in FIG. 5 when fitted into the parallelogram guide shown in FIG. 6, so that like parts in FIG. 7 are designated by like reference numerals in FIGS. 5 and 6, respectively. Therefore, only the differences between these embodiments will be explained in the following, while for all identical features reference is made to the description of FIGS. 5 and 6.

As follows from FIG. 7, the solid block 101 of FIG. 5 forming the force-reduction device is connected in one piece with the fixed leg 139 of the parallelogram guide 100 of FIG. 6 in that the solid portion 102 forming the stationary member is connected in one piece with the fixed leg 139 of the parallelogram. Also, the first coupling member 113 is connected in one piece with the movable leg 147 of the parallelogram beyond the connecting portion 115. A no-material portion 156 in the form of the thin line cut is provided in the embodiment of FIG. 7 instead of the lateral-edge section 112 of FIG. 5 which delimits the first coupling member 113 and part of the first lever 110. This no-material portion 156 separates the solid portion forming the movable leg 147 from the solid portions forming the coupling-member 113 and the lever 110. Similarly, the delimitation shown in FIG. 5 through the upper edge 103 and the following lateral-edge section 104 is replaced by a no-material portion 157 in the form of the thin line cut which joins the no-material portion 106. Finally, a no-material portion 158 in the form of the thin line cut which is provided in the embodiment of FIG. 7 corresponds to the delimitation of the solid block 101 of FIG. 5 through the lateral-edge section 111 and the lower edge 107, which no-material portion 158 extends away from the bending portion 115 to the point where the no-material portion 122 joins the lateral edge consisting of the lateral-edge sections 105 and 111, said point being designated in FIG. 7 by reference numeral 159.

Finally, there is a difference between the embodiment shown in FIG. 7 and the illustration of FIG. 5 in that the magnet arrangement of the force-compensating system is supported on the shelf which also supports the fixed leg 139 of the parallelogram, so that the threaded bores 154 shown in FIG. 5 for the bracket bearing the magnet arrangement in the embodiment of FIG. 5 are missing.

While, in the embodiment illustrated in FIGS. 1 to 4, the fulcrums of the levers act as pedestal (compressively loaded) bearings, in the embodiment of FIGS. 5 to 7 they act as hanging (tension-loaded) bearings, which is of advantage in case of high loads. In all embodiments, all the coupling members act as pull members, which also is of advantage in case of high loads. However, it is also possible to arrange the coupling members in such a way that they act as push members.

Three-stage force-reducing systems, as for instance shown in the embodiments of FIGS. 5 to 6, make it possible to obtain ratios of reduction which are as high as 1:500 up to 1:1,000, while being extremely compact in construction. Besides, the accuracy achieved is very high. For example, resolutions of up to 1 million scale divisions can be achieved. Load ranges of, for example, up to 60 kg can be achieved with an overall height of less than 90 mm.

We claim:

1. A device for reducing a force to be measured in a force-measuring apparatus, said device comprising:
   a single-piece solid block having a plurality of solid portions separated by thin line cuts in said solid block;
   at least one rigid lever for reducing the measured force;
   a stationary member for supporting said lever for rotation at a fulcrum formed in said solid block; and
   at least one axially rigid flectionally elastic coupling member;
   wherein said lever, said stationary member, and said coupling member are each defined by at least one of said plurality of solid portions, which are separated from one another by said thin-line cuts in said solid block which extend alongside zones of maximum load of said solid portions defining said lever, said stationary member and said coupling member under action of the measured force and extend perpendicular to a plane of rotation of said lever at said fulcrum; and
   wherein said solid block has a flectionally elastic domain which defines said fulcrum and connects said lever and said stationary member, and a localized linkage section which connects said lever and said coupling member.

2. The device according to claim 1, characterized in that the no-material portion which separates the solid portion forming the coupling member and the linkage section linking the coupling member to the lever from the solid portion forming the lever is in the form of a thin line cut.

3. The device according to claim 1, characterized in that the no-material portion separating the solid portion forming the stationary member from the solid portion forming the lever, in a second thereof delimiting the fulcrum on a side of said fulcrum facing toward the coupling member, is in the form of a thin line cut.

4. The device according to claim 3, characterized in that the no-material portion which separates the solid portion forming the lever from the solid portion forming the stationary member, in a section thereof which extends away from the section delimiting the fulcrum on the side directed toward the coupling member and then to the linkage section of the coupling member is in the form of the thin line cut.

5. The device according to claim 1, wherein the coupling member represents a first coupling member for applying the force to be reduced to the lever, and the lever represents a first lever for a rigid second lever connected after the first lever and serving to further reduce the force, characterized in that the no-material portion which separates the solid portion forming the first lever on the side which is adjacent the second lever from the solid portion forming the second lever is in the form of the thin line cut.

6. The device according to claim 5, characterized in that a solid portion which forms an axially rigid, flectionally elastic second coupling member and is separated from the solid portion forming the first lever only by a no-material portion in the form of the thin line cut is provided at one end of the solid portion forming the first lever, said end being opposite to the linkage section of the first coupling member to the first lever beyond the fulcrum thereof, whose one end which is opposed to the linkage section of the second coupling member to the first lever is linked to the solid portion supported by the stationary member and forming the second lever.

7. The device according to claim 5, characterized in that the no-material portion which separates the solid portion forming the second coupling member on the side that is opposed to the first lever from the solid portion forming the stationary member is in the form of the thin line cut.

8. The device according to claim 7, characterized in that the no-material portion which separates the solid portion forming the stationary member from the solid portion forming the first lever is in the form of the thin line cut in the section that extends away from the no-material portion delimiting the linkage section of the second coupling member to the first lever on the side which is directed toward the stationary member.

9. The device according to claim 5, characterized in that the no-material portion which separates the solid portion forming the stationary member from the solid portion forming the second lever is in the form of the thin line cut in the region of the fulcrum of the second lever.

10. The device according to claim 5, characterized in that the no-material portion, which separates the solid portion forming the second lever on the side that is directed toward the first lever from the solid portion forming the first lever, and which is in the form of the thin line cut, is inclined in the section that extends away from one end of the no-material portion which separates the second coupling member from the first lever, said end separating the linkage section to the second lever, and then toward the fulcrum of the first lever to an end of the first lever which is opposite to the second coupling member, at such an angle relative to the longitudinal direction of the two levers that the first lever is tapered toward the second coupling member and the second lever toward the first coupling member.

11. The device according to claim 5, characterized in that a solid portion, which is separated from the first lever only by a no-material portion in the form of the thin line cut and forms an axially rigid, flectionally elastic third coupling member, is provided at one end of the solid portion which forms the second lever, said end being opposite to the linkage section of the second coupling member to the second lever beyond the fulcrum thereof, whose one end which is opposite to the linkage section of the third coupling member to the second lever acts upon a solid portion which is supported by the stationary member and forms a rigid third lever serving to further reduce the force.

12. The device according to claim 11, characterized in that the no-material portion which separates the solid portion forming the third coupling member and the linkage section of the third coupling member to the third lever from the solid portion forming the third lever is in the form of the thin line cut.

13. The device according to claim 11, characterized in that the no-material portion which separates the solid portion forming the stationary member from the solid portion forming the third lever is in the form of the thin line cut at least in the section that delimits the fulcrum of the third lever on the side that is directed toward the third coupling member.

14. The device according to claim 1, characterized in that the solid portion which forms the stationary member is mounted, in the interior of a single-piece parallelogram guide which is comprised of a fixedly supported leg of the parallelogram, two axially rigid, flectionally elastic link members which are parallel to each other, and a movable leg of the parallelogram which is parallely guided at the fixed leg of the parallelogram by means of the link members and receives the force to be measured, to the fixed leg of the parallelogram, and in that the respective linkage section of the coupling member adjacent the movable leg of the parallelogram is mounted to the movable leg of the parallelogram.

15. The device according to claim 1, characterized in that the stationary member is formed in the interior of a single-piece parallelogram guide which is comprised of a fixedly supported leg of the parallelogram, two axially rigid, flectionally elastic link members which are parallel to each other, and a movable leg of the parallelogram which is parallely guided at the fixed leg of the parallelogram by means of the link members and receives the force to be measured, as a single-piece solid portion integral with the fixed leg, and in that the respective linkage section of the coupling member adjacent the movable leg of the parallelogram is linked to the movable leg of the parallelogram in one piece.

16. The device according to claim 15, characterized in that the no-material portion which separates the section adjacent the parallelogram guide of the solid portion forming the stationary member from the solid portion forming the parallelogram guide is in the form of the thin line cut.

17. The device according to claim 15, characterized in that the no-material portion which separates the solid portion forming the coupling member adjacent the movable leg of the parallelogram from the solid portion forming the movable leg of the parallelogram is in the form of the thin line cut.

18. The device according to claim 15, characterized in that the no-material portion which separates the solid portion forming the lever adjacent the parallelogram guide from the solid portion forming the parallelogram guide is in the form of the thin line cut.

19. The device according to claim 1, characterized in that the single-piece solid block comprises solid portions which form a fixedly supported leg, two axially rigid, flectionally elastic link members which are parallel to each other and a movable leg of a parallelogram guide, said movable leg of the parallelogram being parallely guided at the fixed leg of the parallelogram by means of the link members and serving to receive the force to be measured, that the stationary member is formed by a single-piece solid portion of the fixed leg of the parallelogram which projects into the interior of the parallelogram guide, and in that the no-material portion which separates the solid portion forming the stationary member on the side that is directed toward one link member from the solid portion forming said link member is in the form of the thin line cut.

20. The device according to claim 19, characterized in that the no-material portion which separates the solid portion forming the lever on the side adjacent one link member, which link member is opposite to the other link member adjacent the stationary member, from the solid portion forming the one link member is in the form of the thin line cut.

21. The device according to claim 19, characterized in that the no-material portion, which separates the solid portion forming the coupling member that extends from the linkage section linking the coupling member to the movable leg of the parallelogram in parallel therewith to the linkage section linking the coupling member to the one end of the lever which is directed towards the movable leg of the parallelogram from the solid portion forming the stationary member, is in the form of the thin line cut.

22. The device according to claim 19, characterized in that the no-material portion, which separates the solid portion forming the coupling member that extends from the linkage section linking the coupling member to the movable leg of the parallelogram in parallel therewith to the linkage section linking the coupling member to the one end of the lever which is directed toward the leg of the parallelogram from the solid portion forming the movable leg of the parallelogram, is in the form of the thin line cut.

23. The device according to claim 19, characterized in that the no-material portion, which delimits the solid portion forming the lever and its fulcrum on the side thereof that is directed toward the stationary member, is in the form of the thin line cut.

24. The device according to claim 19, characterized in that a second coupling member which connects the first lever with a rigid second lever serving to further reduce the force is provided at the end of the solid portion forming the lever, said end being opposite to the linkage section of the coupling member to the end of the lever directed toward the movable leg of the parallelogram and beyond the fulcrum of the lever, and in that the no-material portion separating the solid portion forming the second lever from the solid portion forming the first lever is in the form of the thin line cut.

25. The device according to claim 24, characterized in that the no-material portion which separates the solid portion forming the second coupling member from the solid portion forming the second lever is in the form of the thin line cut.

26. The device according to claim 24, characterized in that the no-material portion which separates the solid portion forming the second coupling member on the side that faces away from the second lever from the solid portion forming the stationary member is in the form of the thin line cut.

27. The device according to claim 24, characterized in that the no-material portion which separates the solid portion forming the second lever on the side that faces away from the first lever from the solid portion forming the stationary member is in the form of the thin line cut.

28. The device according to claim 24, characterized in that the no-material portion separating the solid portion forming the stationary member from the solid portion forming the second lever in a section thereof delimiting the fulcrum of the second lever on the side that is directed toward the second coupling member, and in the following section extending as far as to the linkage section of the second coupling member to the second lever is in the form of the thin line cut.

29. The device according to anyone of claims 1, 6, 11, 14, 15, 21 or 24, characterized in that the flectional elasticity of each coupling member is concentrated in bending portions of the solid block that are formed at the two localized linkage sections of each coupling member.

30. The device according to anyone of claims 14, 15 or 19, characterized in that the flectional elasticity of the link members is achieved by means of bending portions of the solid portions forming the link members, said bending portions being located at the four corners of the parallelogram guide.

31. The device according to anyone of claims 2 to 13 or 16 to 28, characterized in that each thin line cut is formed by spark erosion at least in the region of the bending portions.

32. The device according to claim 31, characterized in that the solid block has a bore for each continuous thin line cut, said bore being connected to each such line cut and serving to receive spark-erosion wire.

33. The device according to anyone of claims 1, 6 or 11, characterized in that for each lever the linkage sections of the coupling members to the lever and the fulcrum of the lever are arranged on a common straight line oriented perpendicularly to the longitudinal direction of the coupling members.

34. The device according to anyone of claims 1, 6 or 11, characterized in that a recess is formed in the solid block at, at least, one of the bending portion, said recess reducing the thickness of the solid block in the direction that is perpendicular to the plane of rotation of the levers.

35. The device according to anyone of claims 14, 15 or 19, characterized in that, in the solid portion that forms the coupling member which is connected with the movable leg of the parallelogram, there is formed a recess between the linkage sections of said solid portion to the leg of the parallelogram and the lever, said recess reducing the thickness of the solid portion forming said coupling member in the direction that is perpendicular to the plane of the parallelogram guide.

* * * * *